Aug. 28, 1928.

B. LEON ET AL

BEETLE TRAP

Filed Feb. 6, 1928

1,682,575

INVENTORS
Benjamin Leon and
Mitchell Fow
BY
ATTORNEYS.

Patented Aug. 28, 1928.

1,682,575

UNITED STATES PATENT OFFICE

BENJAMIN LEON AND MITCHELL FOW, OF CAMDEN, NEW JERSEY.

BEETLE TRAP.

Application filed February 6, 1928. Serial No. 252,079.

This invention, stated in general terms, relates to insect traps and has more particular relation to a trap used in the catching of the so-called Japanese beetle The leading object of the present invention is to provide a simple, efficient, and practical funnel-like device which may be cheaply manufactured from thin metal for use in connection with milk bottles, Mason jars, and similar glass containers, although it may be used in connection with any style of container having a neck.

A further object of the present invention is to provide a device of the character stated the bait containing portion of which may be stamped from a single piece of metal.

A further object of the present invention is to provide a device of the character stated in which the bait containing member has detachable relation with its funnel-like support so that the bait container may be readily refilled.

A still further object of the present invention is to provide a device of the character stated in which the bait container is open at both ends and provided with stoppers so that refilling of the bait container may be readily accomplished.

A further object of the present invention is to provide a device of the character stated having a funnel-like member, the apertured side walls of which are flanged to removably receive the open ends of the bait container, thus eliminating the need of brazing, soldering, or other fastening means.

With these and other objects in view, the invention consists of the novel construction hereinafter described and finally claimed.

The nature, characteristic features and scope of the invention will be more fully understood from the following description taken in connection with the accompanying drawings forming part hereof, and in which.

For the purpose of illustrating our invention we have shown in the accompanying drawings several forms thereof which are at present preferred by us, since the same have been found in practice to give satisfactory and reliable results, although it is to be understood that the various instrumentalities of which our invention consists can be variously arranged and organized and that our invention is not limited to the precise arrangement and organization of the instrumentalities as herein shown and described.

Figure 3:
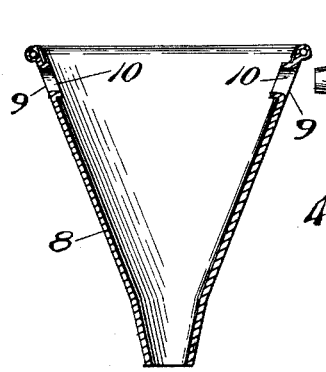
Fig. 3, is a view of the funnel-shaped support for the bait container shown in Fig. 2.
Figure 4:
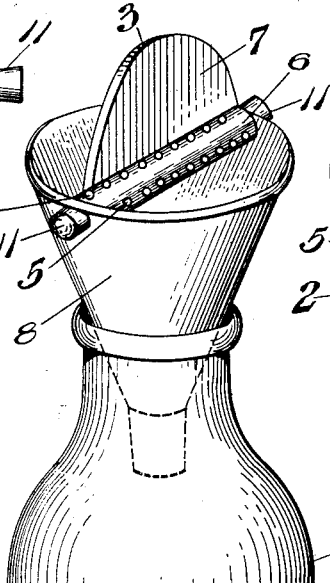
Fig. 4, is a view in perspective of the parts shown in Figs. 2 and 3 assembled and fitted to the neck of a container for use in accordance with the invention.
Figure 1:
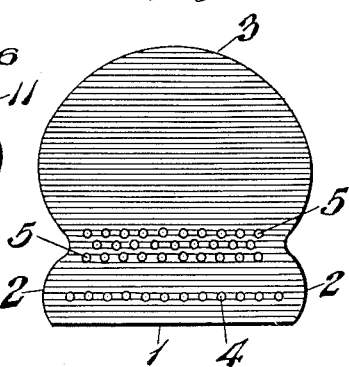
Fig. 1, is a view of a blank from which the bait container is formed.
Figure 2:
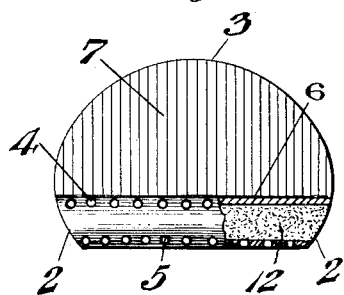
Fig. 2, is a view in front elevation, partly sectioned, illustrating the bait container as formed from the blank shown in Fig. 1.

Referring now to the drawings, in which similar numerals of reference indicate corresponding parts, and with special reference to Fig. 1, there is disclosed a blank of thin metal, as tin, having a straight edge designated 1; opposed, curved edges 2; and a generally curved part 3 which joins with the curved parts 2—2. Paralleling the straight edge 1 of the blank there is arranged a single line of apertures 4, and paralleling the line of apertures 4 are several lines of apertures 5, the side apertures 5 extending across the blank adjacent the juncture points of the curved parts 2 and 3. The straight edge 1 of the blank in practice is folded back upon a curved line until the straight edge 1 abuts against the blank proper, whereupon it may be brazed or soldered to place to form a bait container 6 of circular cross-section, see Fig. 2. The series of apertures 5 thereupon extend entirely across the bottom of the bait container, and the apertures 4 are omitted at the top of the container. The tubular container thus formed is open at each end and the curved parts 2—2 become in alignment with the curved edge 3 and provide symmetry to the device. The main part of the blank is thus projected from the bait container 6 and forms a baffle plate 7 which as shown in the drawings is vertically extended, although it might be extended at an angle. The completed bait container thus described is adapted for detachable connection with respect to the funnel-like member 8, shown in Fig. 3. This funnel-like member 8 has its side walls apertured as at 9—9, and these openings are flanged as at 10, which flanges project inwardly. The openings 9—9 are oppositely disposed in alignment with one another, and the open ends of the bait container 6 are adapted to engage over the flanges 10 so that the bait container extends across the funnel-like member in horizontal position, as seen in Fig. 4. The open ends of the bait container 6 are closed by means of stoppers 11, preferably cork.

In practice the bait container 6 is filled with the desired bait, designated 12, and the container fitted over the flanges 10 as previously described, and the corks 11 driven home. The bait may be of any desired form, but for the trapping of Japanese beetles a sweet scented mixture is used for the attracting of the beetles, who in their haste to reach the bait dash themselves against the baffle plate 7 and are precipitated through the funnel-like member 8 to the beetle receiving receptacle 13, which as shown in Fig. 4 is a bottle, preferably of glass, for the reason that the beetles when caught have the tendency to dash towards daylight, in contra-distinction from climbing up the sides of the vessel.

Obviously one or more baffle plates 7 may be employed, and if desired the bait containing receptacle may be fixed to the funnel-like member 8 by solder or otherwise. Also it is apparent that the arrangement of holes 4 and 5 used for the escape of odors from the bait container 6 may be variously arranged.

Figure 5:
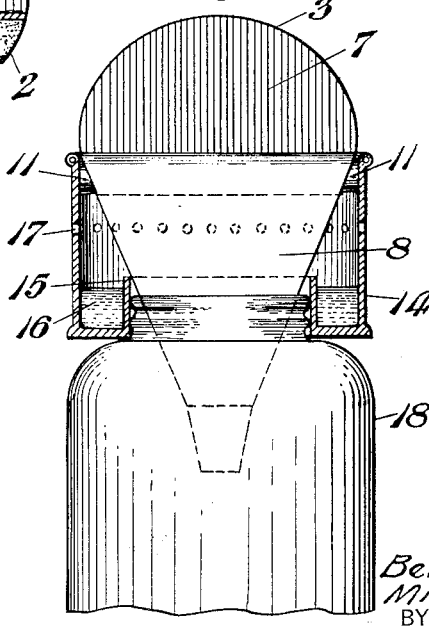
Fig. 5, is a view in elevation, partly sectioned, illustrating the manner of using the novel device of the invention in conjunction with an auxiliary bait container.

Sometimes it may be desirable and necessary to provide extra bait in order to attract the beetles. For this purpose we employ a cup-like receptacle 14 the bottom of which is provided with a central opening having an annular flange 15 therearound. The flange 15 projects upwardly into the container 14 for a considerable distance, thus providing an annular space to receive other bait 16, the odors of which may escape through the apertures 17 in the side walls of the container 14. This container 14 has its flanged opening fitted over the neck of a suitable container, as for instance a Mason jar 18, see Fig. 5. The device of our invention is then seated within the container 14 with the sloping walls of the funnel-like member 8 resting upon the annular edge of the flange 15.

It will now be apparent that we have devised a novel and useful construction which embodies the features of advantage enumerated as desirable in the statement of the invention and the above description, and while we have in the present instance shown and described the preferred embodiments thereof which have in practice been found to give satisfactory and reliable results, it is to be understood that the same are susceptible of modification in various particulars without departing from the spirit or scope of the invention or sacrificing any of its advantages.

Having thus described our invention, what we claim as new, and desire to secure by Letters Patent, is:

1. A device of the character stated comprising a funnel-like member having an opening in its side wall adjacent the upper rim thereof, an open-ended bait receptacle extended across said member with its open end in register with the opening in said member, a baffle plate projected from said receptacle, and a stopper for closing the open end of said member.

2. A device of the character stated comprising a funnel-like member having an opening in its side wall adjacent the upper rim thereof, an open-ended bait receptacle extended across said member with its open end in register with the opening in said member, a baffle plate projected from said receptacle, said receptacle and baffle plate being of integral structure, and a stopper for closing the open end of said member.

3. A device of the character stated comprising a funnel-like member having a flanged opening in its side wall adjacent the upper rim thereof, an open-ended bait receptacle extended across said member with its open end in register with the opening in said member and engaging over said flange, a baffle plate projected from said receptacle, and a stopper for closing the open end of said member.

4. A device of the character stated comprising a funnel-like member having an opening in its side wall adjacent the upper rim thereof, an open-ended bait receptacle extended across said member with its open end in register with the opening in said member, said receptacle being apertured throughout its length, a baffle plate projected from said receptacle, and a stopper for closing the open end of said member.

5. In combination a cup-like bait container having an annular, flanged, jar engaging opening in its bottom, a funnel-like member arranged within said container with its sloping side walls seated upon said flange, a bait receptacle extended across said member, and a baffle plate projected from said bait receptacle.

BENJAMIN LEON.
MITCHELL FOW.